United States Patent [19]
Keplinger et al.

[11] Patent Number: 5,416,875
[45] Date of Patent: May 16, 1995

[54] OPTICAL FIBER LIGHTING APPARATUS AND METHOD

[75] Inventors: John S. Keplinger, Stockton, Calif.; Nilesh P. Kacheria, Bombay, India; George Awai, Danville; David R. Borck, Redwood City, both of Calif.

[73] Assignee: Fiberstars, Inc., Fremont, Calif.

[21] Appl. No.: 253,845

[22] Filed: Jun. 3, 1994

Related U.S. Application Data

[62] Division of Ser. No. 24,185, Feb. 26, 1993, Pat. No. 5,345,531.

[51] Int. Cl.⁶ .............................................. G02B 6/44
[52] U.S. Cl. ..................... 385/102; 385/104; 385/106; 385/115; 385/901; 362/32
[58] Field of Search .......... 362/32; 385/901, 100–114, 385/115–117

[56] References Cited

U.S. PATENT DOCUMENTS

| | | | |
|---|---|---|---|
| 4,961,617 | 10/1990 | Shahidi et al. | 385/901 |
| 5,249,105 | 9/1993 | Koizumi | 362/36 |
| 5,333,228 | 7/1994 | Kingstone | 385/901 |
| 5,339,223 | 8/1994 | Kremenchugsky et al. | 385/901 |
| 5,345,531 | 9/1994 | Keplinger et al. | 385/102 |

*Primary Examiner*—Rodney B. Bovernick
*Assistant Examiner*—John Ngo
*Attorney, Agent, or Firm*—Albert C. Smith

[57] ABSTRACT

A composite optical cable for lateral emission of light flux therefrom includes a plural number of sets of transparent optical fibers with each set of fibers assembled into a single cable and with a plurality of single cables assembled in the composite optical cable. The sets of optical fibers forming the single cables may be wound in one direction of rotation to form a spiral of fibers with length, and the single cables may be wound in the opposite direction of rotation to provide the composite optical cable. Selected masking schemes provide apertures at predetermined locations along the single cables through which light flux carried by the cables may be emitted for special lighting effects.

7 Claims, 3 Drawing Sheets

OPTICAL FIBER LIGHTING APPARATUS AND METHOD

This is a divisional of application Ser. No. 08/024,185, filed on Feb. 26, 1993, now U.S. Pat. No. 5,345,531.

FIELD OF THE INVENTION

This invention relates to optical lighting fibers, and more particularly to cables of optical fibers which exhibit lateral emission of light; over the length thereof from one or more light sources disposed at one or both ends of the cable.

BACKGROUND OF THE INVENTION

Contemporary lighting techniques for aesthetic lighting or safety illumination applications commonly rely upon lateral leakage of light flux from one or more optical fibers that are optically coupled to a source of light for distributing the light from the surface of the optical fiber or fibers over the length thereof. This produces a pleasing effect of light in any color being distributed in a narrow strip over a substantial distance from the illuminating light source. Glass optical fibers or plastic optical fibers having selected lateral emission properties may be used in such lighting applications that promote flexibility and immunity from electrical shock and that exhibit low-cost, superior characteristics over traditional neon tubes or discrete light sources oriented in a linear array.

Optical fibers for use in such lighting applications commonly include light-scattering schemes within the fibers to enhance lateral emission of light from the fibers, which schemes may include material anomalies such as particles or bubbles distributed in the core material of the fibers to deflect light flux from within the core material through the surface of the fibers substantially uniformly over the length of the fibers. Schemes of this type tend to exhibit higher levels of light flux laterally emitted from the optical cable closest to the light source or sources disposed near one end or both ends of the fibers, and lower levels of light flux laterally emitted from the fibers a locations remote from the light source. Techniques for graduating the density of light scattering anomalies per unit length of fiber in order to compensate for the non-uniformity of the illumination with distance along the fibers have not been successful for low-cost production of optical fibers of substantial length.

SUMMARY OF THE INVENTION

In accordance with one embodiment of the present invention, a plurality of optical fibers may be twisted or woven together to form a single cable of fibers, and in another embodiment a plurality of single cables may be twisted or woven together to form an optical cable that exhibits a perceived improvement in the uniformity of lateral emission of light flux over the length thereof between light source or light sources which are optically coupled to one or both ends of the cable. It is believed that this continuous bending by twisting or weaving (i.e., convoluting, herein) of the optical fibers into cabled structures provides the equivalent of a continuum of micro bends at which light flux is laterally emitted from a clear fiber. Such micro bends of the fibers with concomitant benefits of perceived improvement in the lateral emission of light flux over the length of the assembled fibers may also be achieved by weaving or otherwise grouping the fibers in alternative embodiments of the present invention.

In another embodiment of the present invention opaque, reflective strips of material such as aluminum foil, or translucent strips, or colored transparent strips may be wound in non-overlapping spiral fashion over single cables or over the entire assembled cable to alter the pattern of emerging light flux in visually contrasting manner, or to color the light flux emerging from the cable in selected patterns at locations along the length thereof. In another embodiment of the present invention multiple strips of such opaque reflective material or of translucent or colored transparent material are wound in spiral manner in opposite rotations around single cables or around the entire assembled cable to provide apertures at regularly-spaced intervals along the length of the cable through which light flux may be laterally emitted. Similar apertures may be formed in another embodiment using a sheath of opaque or translucent or colored transparent material disposed over the assembled fibers and having apertures therein of selected shape through which light flux emerging from the assembled fibers is emitted. Additionally, a plurality of such single cables may be twisted or otherwise oriented together and individually illuminated in a sequence that provides the visual effect of numerous individual light sources emitting light from discrete locations that appear to move along the length of the fiber cable.

DESCRIPTION OF THE PREFERRED EMBODIMENT

Figure 1:
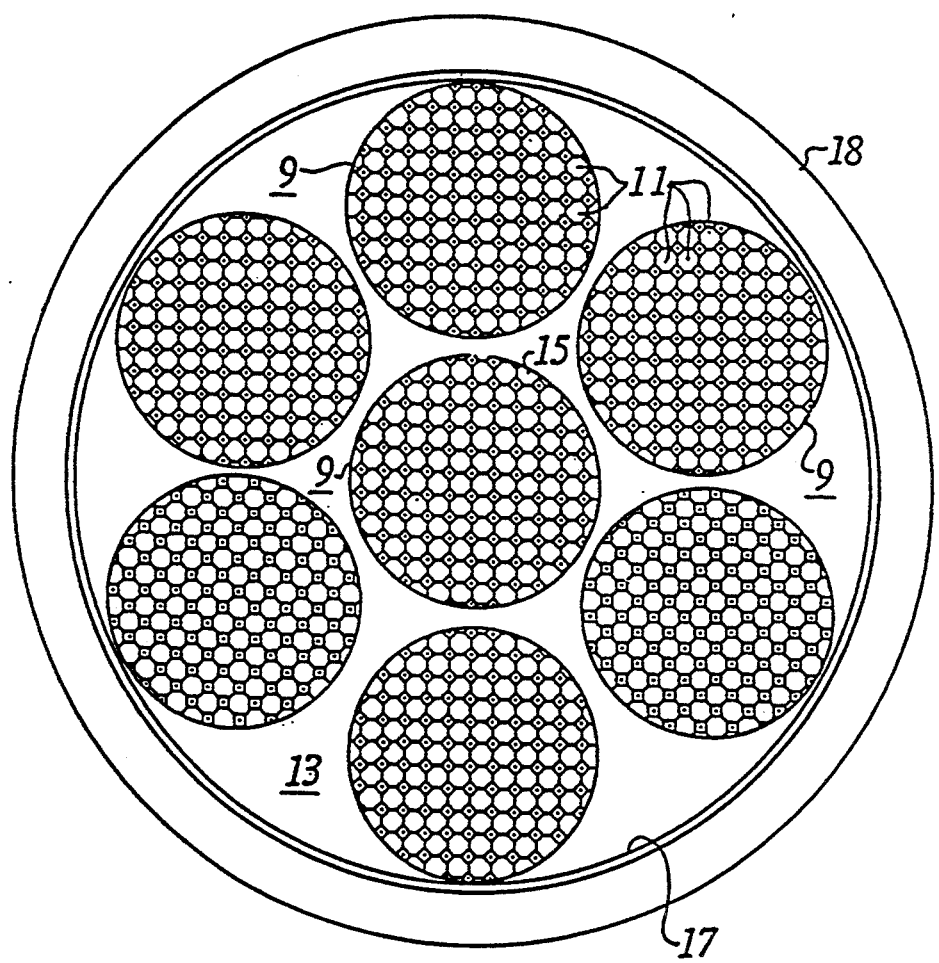
FIG. 1 is a cross-sectional view of a composite cable of optical fiber in accordance with one embodiment of the present invention.
Figure 2:
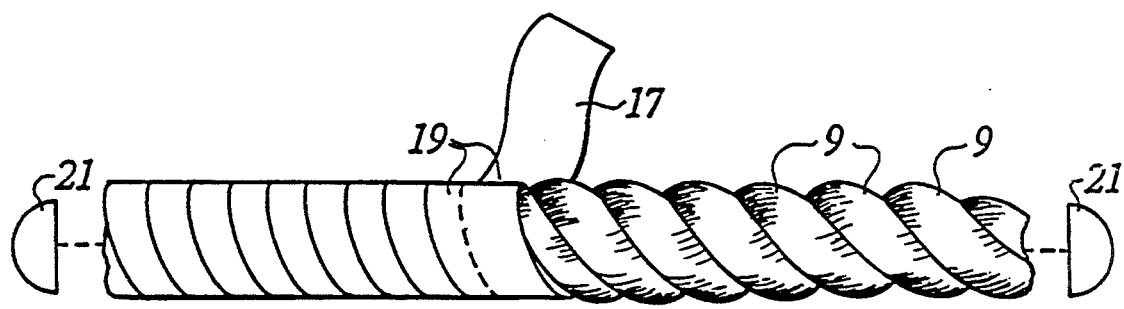
FIG. 2 is a pictorial view of a partial composite cable of FIG. 1 in an optical cable lighting system.

Referring now to the cross-sectional view of FIG. 1, and the pictorial view of FIG. 2, there is shown an optical cable prepared in accordance with one embodiment of the present invention. In this embodiment, each of the single cables 9 is formed of a plural number of two or more individual optical fibers 11 that are formed in conventional manner including a core of a plastic material such as polymethylmethacrylate (PMMA) having an associated index of refraction, with a diameter of about 0.010 to 0.080 inches (typically, 0.030 inches)., and including an outer cladding layer of plastic material having a different index of refraction. The fibers are all twisted or woven or otherwise convoluted together in a continuous manner over the length of the cable. In another embodiment including about 14 individual optical fibers 11 forming a single cable 9, about four of such fibers may form a generally straight, central core of the cable with the remaining individual fibers continuously wrapped around the central core of fibers. Fiber optic cables formed in these ways promote perceived improvement in the lateral emission of light flux from the surface of individual fibers, with total light flux including the light flux that is laterally emitted from the central or core fibers through the surrounding outer or surface-oriented fibers appearing to be more uniformly distributed over the length of the cable when illuminated from both ends. In typical applications, the twist of all such individual fibers (or of the outer fibers over a central core of fibers) may be arranged in one rotational orientation, for example, clockwise lay, with about 3½" to 7½" pitch (i.e., the distance along the cable over which a fiber exhibits one complete wrap), and with negligible tension in individual fibers as they are twisted together.

A plural number of two or more, and typically of about 7 to 12 of such individual cables 9 are then wrapped or twisted together in opposite or counter-clockwise rotational orientation (or same one rotational orientation) with about 4½" to 10" pitch to form a composite cable 13 of optical fibers with negligible tension in single cables 9 and in individual fibers 11 as the fibers and the single cables are twisted or wound together. Thus, individual optical fibers 11 in each of the single cables 9 may be oriented near the surface over some portion of one or more pitches. Alternatively, a single cable 15 may be oriented as a straight, central core cable with the remaining single cables 9 twisted around the core cable 15 to remain adjacent the surface of the composite cable 13 over its entire length.

The composite cable 13 may then be wrapped with a layer of clear or colored, transparent tape 17 or other sheath covering that is formed to about 0.001 inch thickness of a polymer material such as "TEDLAR" or "MYLAR", commercially available from DuPont or the like, which can provide heat insulation and, optionally, ultraviolet-ray inhibitors. The sheath covering 17 when formed of a web or strip or tape may be oriented with about 30 to 40 percent of its width overlapping 19 in each wrap or lay of the tape 17 about the composite cable 13. Alternatively, a sheath of such material may be formed by extrusion or other suitable means to provide heat insulation and, optionally, ultraviolet-ray inhibitors. Then, a protective sheath 18 of clear flexible plastic material such as polyvinyl chloride may be coextruded over the composite cable 13 in conventional manner to enshroud the composite cable 13 in an outer jacket 18 and thereby provide moisture and abrasion protection for the individual fibers that form the composite cable 13. Additionally, ultraviolet-ray inhibitors and biological inhibitors against marine vermin, bacterial and fungal activity may be incorporated into the composition of the clear, flexible material of the outer jacket 18, and colorants or dyes may also be incorporated into the material of the outer jacket 18 to provide desired aesthetic lighting effects.

It is believed that such twisting or weaving or other similar assembling of individual fibers 11 within a single cables 9 and within the composite cable 13 provides sufficiently slight bends in each optical fiber along its length to enhance the lateral emission of light flux from the individual fibers at such bends substantially uniformly over the length of the fiber. Accordingly, such single cables 9, or composite cable 13, with light sources 21 coupled to the ends thereof exhibit improved perceived uniformity of lateral light emission with distance therealong from the end adjacent a light source toward the center of the cable that is most remote from a light source. Additionally, it is believed that the introduction of an insulating sheath 17 between the assembled cable and the outer jacket 18 reduces the deterioration of optical properties of the optic fiber material attributable to heat associated with conventional co-extrusion processes used to form the outer jacket 18 over the assembled cable. In one embodiment, the sheath 17 thus promotes perceived uniformity of laterally emitted light from the assembled cable over lengths to about 200 feet.

In another embodiment of the present invention, a strip or tape 17 may be opaque, reflective material such as aluminum foil or may be translucent or colored transparent material that is wrapped around a single cable 9 or around an entire composite cable in non-overlapping relationship to provide a portion of the surface of a single cable 9 (or of the composite cable 13) that is exposed to permit lateral emission of light from the cable in a continuous, spiraling stripe.

Figure 3A:
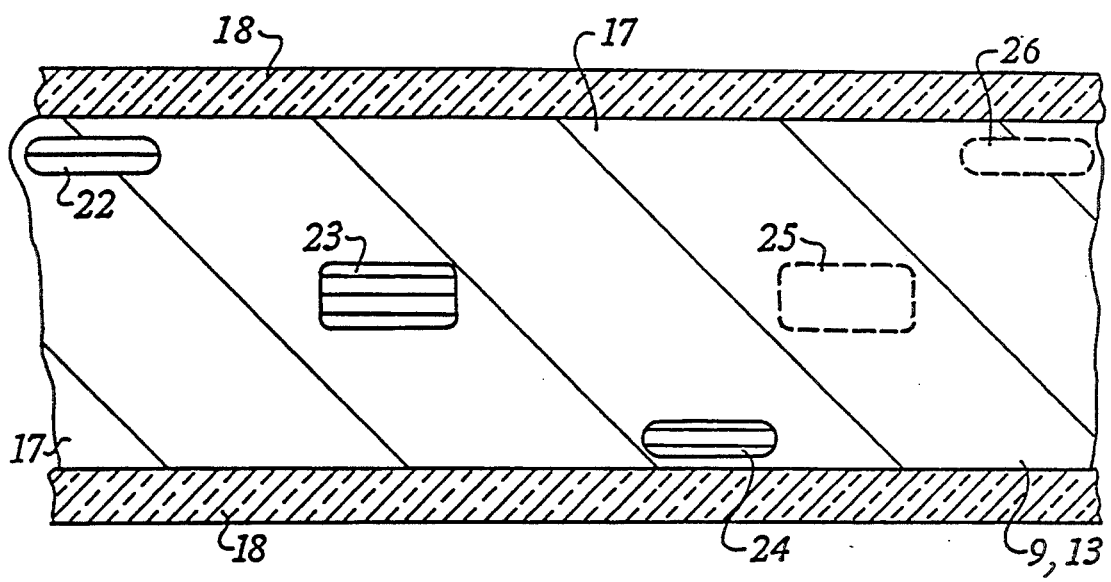
FIGS. 3(a) or 3(b) are partial pictorial views of cables of optical fibers in accordance with other embodiments of the present invention arranged to provide apertures at selected locations along the assembled cable.
Figure 3B:
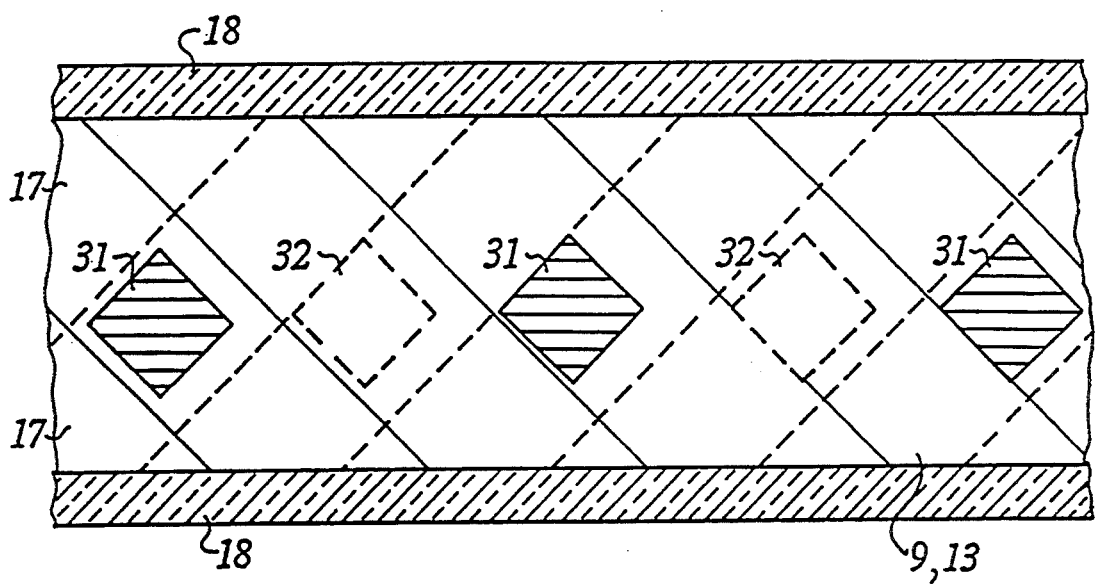

In still another embodiment of the present invention as illustrated in FIG. 3(a), a sheath 17 may be formed about a single cable 9 (or about the composite cable 13) to include apertures 22, 23, 24 (on the front side), 25, 26 (on the rear side) in numerous shapes and spacings about the surface of the cable 9, 13. Alternatively, as illustrated in FIG. 3(b), at least two such strips or tapes may be wound around a single cable, or around the composite cable, in non-overlapping relationship and in opposite directions to form a sheath that exposes a stripe of cable surface that is then intersected by another strip or tape wound in the opposite direction to expose only apertures of surface 31 (on front side) and 32 (on rear side) at selected intervals along a cable through which light may be emitted, thereby to provide the appearance of discrete light sources located at selected intervals along the length of the cable. Of course, a sheath 17 of such materials may also be disposed about each single cable (or about the composite cable 13), and include apertures therein of selected shape and at selected intervals and locations along the cable to provide similar appearance of discrete light sources.

Figure 4:
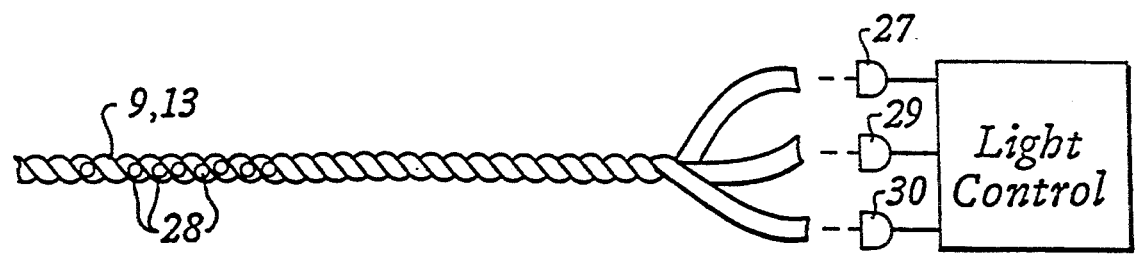
FIG. 4 is a pictorial view of an optical fiber lighting system according to one embodiment for forming the illusion of moving light sources along the length of the cable.

In another embodiment of the present invention, as illustrated in FIG. 4, two or more single cables are each formed with opaque (or translucent or colored transparent) sheaths thereon having apertures 28 positioned at selected intervals of, say, 1 inch along the length with the apertures being formed at substantially the same selected spacing on each cable, but displaced an increment of length from the positions of the apertures on other cables. Thus, the apertures on each cable are displaced incrementally from the apertures on other cables. Light sources 27, 29, 30 are positioned at least on one of the ends of each individual cable and are each sequentially activated (or, are activated in end-end pairs) in one embodiment for pulsed operation in recurring manner to produce the appearance of light sources 'moving' along the length of the cable. In one embodiment with at least 3 cables 9 and associated light source, or end-end paired light sources, the direction of the apparent movement is determined by the order or sequence in which the associated light sources are recurringly activated. The single cables need not be twisted together, but may be retained in adjacent orientation over their length by an outer sheath or jacket of transparent material that retains the single cables in relative positions, and that may also enshroud the cable and include ultraviolet-ray inhibitors to provide protection against environmental elements.

Figure 5:
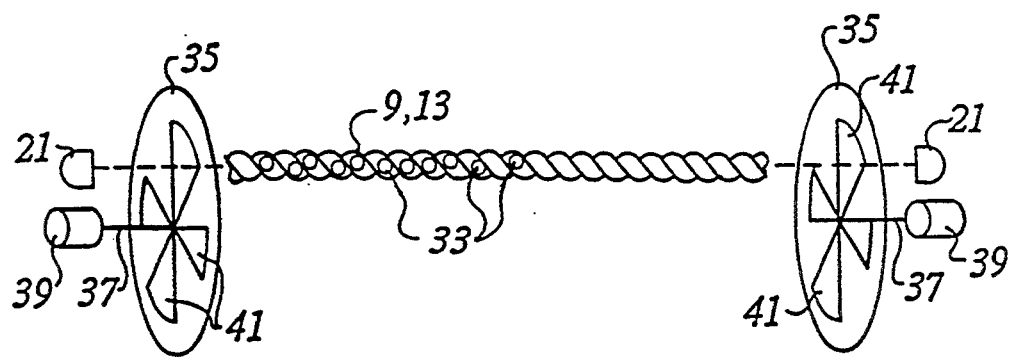
FIG. 5 is a pictorial view of an optical fiber lighting system according to another embodiment for forming the illusion of moving light sources along the length of the cable.

Referring now to the pictorial diagram of FIG. 5, another embodiment of the present invention is illustrated in which an assembled composite cable 9, 13 includes two or more single cables that are twisted together and are covered by a sheath that is extruded or wrapped about the composite cable in a manner as previously described to provide apertures 33 of selected spacings and shapes (e.g. arrows or pointers) along at least a portion of the length of the cable. A shutter wheel 35 that is mounted to rotate about the axis of the shaft 37 of drive motor 39 is disposed in the path of light flux from light source 21 to the end of the cable in order to interrupt the illumination of the cable from the light source 21. Specifically, apertures 41 in the shutter wheel 35 may be separated by a frame of opaque material having a radial extent that may be at least as long as the diameter of the cable 13. Thus, as the wheel 35 rotates, the transition in illuminating flux "sweeps" over the sectional area of the end of the cable. And, as illustrated in the sectional view of FIG. 1, the fibers that are assembled into single cables 9 are confined to specific segments of the total cross sectional area of the cable. Thus, as an aperture 41 in the wheel transmits light flux to the end of the composite cable 13, only a single cable (or cables) in the initially-illuminated segment of the cable end are illuminated, and that single cable (or cables) is illuminated along the length of the composite cable, but dominantly visibly only in the convolutes of twist that appear near the lateral surface of the cable 13 being viewed. Therefore, the same single cable appears illuminated over short lengths that are spaced along the entire length of the composite cable 13. As other single cables 9 that are confined to segments of the sectional area of the composite cable 13 are illuminated through an aperture 41 of the wheel as it rotates across the sectional are of the end of the composite cable, other single cables in spaced locations within the cable end also are illuminated over the entire length of the cable, but the light flux laterally emitted therefrom appears at the surface being viewed to be in short lengths that are spaced apart along the length of the composite cable 13. Thus, as separate single cables 9 are sequentially illuminated, separate spatially-oriented twists of those single cables emit light that is perceived from one viewing surface to 'move' along the composite cable 13. Of course, light sources 21 may be positioned to illuminate both ends of composite cable 13, and a shutter wheel 35 and associated drive motor 39 may be disposed at each end of the cable for synchronized operation to enhance uniformity of illumination from the cable 13 over the entire length thereof. Also, both ends of the cable 13 may be oriented to be illuminated by the same one light source through one shutter wheel 35. And, shutter wheel 35 may include multiple different color filters in the apertures 41 to provide aesthetically—pleasing visual sensations of different color lights spaced apart and 'moving' along the length of cable 13.

Therefore, the optical fiber cable of the present invention provides enhanced uniformity of lateral emission of light flux over the length of the cable, and also provides enhanced special effects attributable to spatial and time-oriented synchronized illumination of selected segments of the optical fiber cable.

What is claimed is:

1. An optical lighting apparatus comprising:
    a set of plurality of optical fibers, each fiber including a core of material that is transparent to radiation in a selected waveband, and including a layer of cladding material surrounding the core;
    said set of a plurality of optical fibers being assembled in continuously convoluted relationship along the length thereof to form a cable, and being adapted to receive light flux at least one end thereof for laterally emitted light flux received thereby substantially along the length thereof from said end; and
    a first strip of material of optically contrasting characteristics wound about said cable in non-overlapping relationship to form a substantial spiral of the material with length along the cable in a selected direction of rotation for forming an aperture to expose in visually contrasting manner an elongated portion of the surface of the optical cable in a spiral orientation along the length thereof.

2. The optical lighting apparatus according to claim 1 comprising:
    a second strip of material of optically contrasting characteristics wound in non-overlapping relationship about said cable and said first strip in a direction of rotation opposite said selected direction of rotation for forming apertures to expose therethrough discontinuous portions of the surface of the optical cable at spaced locations along the length thereof.

3. An optical lighting apparatus comprising:
    a plural number of bundles of optical fibers, each bundle being assembled in continuously convoluted relationship with the other of the plural number of bundles along the length thereof to form a cable;
    a sheath of non-transparent material having apertures therethrough at spaced locations disposed about the cable of the surfaces of the bundles of optical fibers being exposed at the apertures along the length of the cable; and
    a source of radiation disposed at an end of said cable to supply radiation thereto for producing output radiation through the apertures in response to the source of radiation supplying radiation to an end of said cable.

4. The optical lighting apparatus according to claim 3 wherein:
    said source is disposed at an end of the cable to supply radiation to a bundle of optical fibers, and comprising other sources disposed at an end of the cable to supply radiation to the other of the plurality of bundles of optical fibers, each source supplying radiation to a bundle of optical fibers during recurring selected intervals for producing output radiation through the apertures associated with the bundles of optical fibers in response to the sources of radiation supplying radiation to the bundles of optical fibers in selected intervals.

5. The optical lighting apparatus according to claim 3 wherein said source supplies radiation to a bundle of optical fibers during an interval that is delayed from an interval during which radiation is supplied to another of said bundles of optical fibers for producing output radiation through the apertures associated with the bundles of optical fibers along the lengths thereof that produce a visual appearance of movement of lights along the length of the optical fibers.

6. A method of forming optical lighting apparatus including a plurality of flexible optical fibers, each including a core of transparent material and a layer of transparent cladding material surrounding the core, the method comprising the steps of:

assembling a set of a plural number of the optical fibers of selected length;

forming said set of optical fibers in contiguous relationship over the length thereof to provide an optical cable adapted to receive light flux at at least one end thereof for laterally emitting light flux received thereby substantially along the length thereof from said end; and forming a sheath about the optical cable including winding about the optical cable in one direction in non-overlapping relationship a strip of material of optically contrasting characteristics to provide an aperture along the length of the optical cable for emitting light flux therethrough that is substantially spirally oriented along a length of the optical cable.

7. The method according to claim 6 comprising:

winding a second strip of material of optically contrasting characteristics about the optical cable in an opposite direction in non-overlapping relationship to provide apertures for emitting light flux there through at a plurality of spaced locations along the length of the optical cable.

* * * * *